Sept. 2, 1941. J. F. MEYER 2,254,619
SIMULATED AMUSEMENT THERMOMETER
Filed April 4, 1940
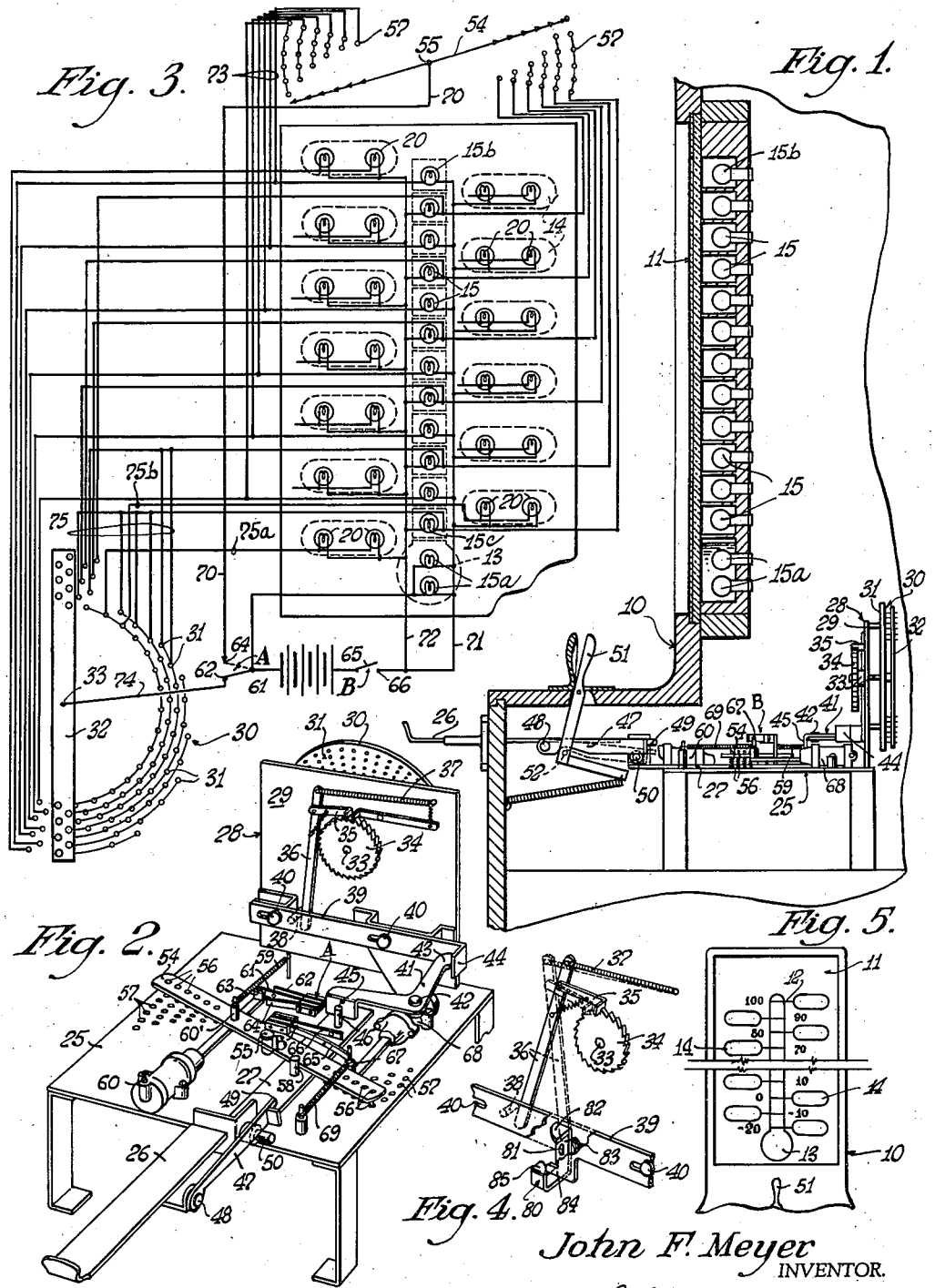
John F. Meyer
INVENTOR.
BY Clarence E. Threedy
HIS ATTORNEY.

Patented Sept. 2, 1941

2,254,619

UNITED STATES PATENT OFFICE 2,254,619

SIMULATED AMUSEMENT THERMOMETER

John F. Meyer, Chicago, Ill., assignor to The Exhibit Supply Company, Chicago, Ill., a corporation of Illinois Application April 4, 1940, Serial No. 327,743

13 Claims. (Cl. 177—384)

This invention relates to amusement apparatus and has for its principal object the provision of a device of this class which simulates in appearance and operation an ordinary mercury or analogous thermal expansion fluid type of thermometer, the simulation being accomplished through the employment of electric lamps arranged in a series, for example, to represent the stem or column of the thermometer, and switching means for successively illuminating the lamps to represent the rising of the mercury column. The simulation is carried farther by having certain lamps, representing the bulb portion of the thermometer, remain illuminated during the serial illumination of the other lamps, and further by illuminating different groups of the lamps in contiguity at different times to represent the various heights at which the mercury column is supposed to have risen upon each operation of the device.

Viewed from another aspect, it is an object of the invention to provide an amusement device in the nature of a simulated thermometer wherein the column of mercury or other thermo-responsive substance is represented by a series of electric lights which are illuminated one after another beginning with the bottom of the series to simulate the upward movement of the mercury column corresponding to a rising temperature.

A further object is the provision of means for lighting the lamps in groups beginning from the bottom of the series to include a different number of lamps each time the apparatus is set into operation so as to designate different temperature readings after the lamps have been serially illuminated as aforesaid.

A further object is the arrangement of legend lamps alongside the series of measuring lamps, and means for illuminating the legend lamp opposite the topmost lamp of any group of the measuring lamps illuminated as aforesaid in representing the height of the column of mercury, the legend lamps being adapted to illuminate some arbitrary or fanciful indicium on a glass panel or the like associated with the lamps and arranged to represent the thermometer scale.

Still further objects relate to the provision of switching and control mechanism for effecting the energization of the lamps as aforesaid and particularly for the purpose of changing or permutating the group illumination of the lamps as aforesaid so that a different temperature reading will result upon each successive operation of the machine.

Other objects, advantages and novel aspects of the invention reside in certain details of construction as well as the cooperative relationship of the component parts of the illustrative embodiment described hereinafter in view of the annexed drawing, in which:

Fig. 1 is a vertical fragmentary section through the amusement device showing particularly the vertical column of series or measuring lamps behind the thermometer panel;

Fig. 2 is a perspective of the control and switching mechanism;

Fig. 3 is a circuit diagram;

Fig. 4 is a schematic perspective of the spinning means for the permutating switch;

Fig. 5 is a front elevation of the thermometer panel.

Referring to Fig. 1, the amusement device is mounted in a cabinet 10 in which is a vertical panel 11 of glass or like translucent material disposed to represent the face of the thermometer and, as shown in Fig. 5, having delineated thereon the graduations 12 of a thermometer stem, the lower end of the stem being provided with an enlarged representation 13 of the bulb of the thermometer and there being legend-bearing panels 14 situated alternately on opposite sides of the stem. The panel may also carry numerical indicia corresponding to the readings or graduations on the stem.

Behind the panel 11 is a vertical series or column of measuring lamps 15 each suitably spaced between the graduations 12 on the stem, these lamps being adapted to be successively illuminated beginning with the two lowermost lamps 15a which are situated behind the bulb portion 13 to represent in similitude the upward movement of a column of mercury or some analogous thermal-expansive substance, the entire series being thus illuminated to include the topmost lamp 15b.

The arrangement is such that when the topmost lamp 15b is illuminated as aforesaid, one or more of the lamps will thereafter be relatively permanently illuminated beginning with the bottommost lamps of the column, for the purpose of indicating the simulated column of mercury standing in the stem or tube. Under these circumstances, it would be possible for only the two lamps 15a in the bulb portion 13 to be illuminated, such a condition representing the lowest temperature which would be indicated on the thermometer; or the entire column of lamps, including lamps 15a and the topmost lamp 15b, could be illuminated to indicate the highest temperature measured, and, of course, intermediate temperatures would be indicated by illumination of less than all of the lamps.

After the series illumination of the lamps in the thermometer stem, and preferably simultaneously with the group illumination of these lamps, certain legend lamps 20 will be illuminated, these lamps being positioned in groups behind each of the legend indications or panels 14 on the thermometer scale, the arrangement being such that the legend panel 14 opposite the topmost lamp of any group illuminated as aforesaid, will itself be illuminated for the purpose of designating some arbitrary or fanciful indicium or legend carried thereon which is purported to correspond to the temperature indicated by the topmost lamp of the group. For example, the machine may be intended for purposes of amusement to give an indication of one's disposition, and to this end, the several panels 14 may bear printed legends such as "Happy," "Grouchy," "Mean," "Silly," etc., one of these panels being illuminated following the operation of the thermometer as aforesaid and purporting thus to designate the disposition of the person who has set the machine into operation. Obviously other arrangements will occur to those skilled in the art, the one herein explained being set forth for purposes of illustration.

The mechanism for controlling the operation of the lamps as aforesaid is shown in Fig. 2 and includes an insulated panel 25 on which is mounted a master control slide 26 and an operating slide 27 actuated thereby. At the rear of the insulated panel is a grouping or permutating switch generally indicated at 28 and including an upstanding panel member 29 having mounted thereon a circular contact bank 30 including a plurality of banks of contacts 31 arranged in radial groups (see lower part of Fig. 3 also) to be engaged by contact wipers on a rotating contact arm 32 carried on shaft 33.

The movable or wiping contact member 32 of the permutating switch may be advanced in step-by-step fashion through the provision of a ratchet 34 on shaft 33 and engaged by a pawl 35 on a lever 36 pivoted on panel 29 and normally urged into an advanced position by a spring 37 so that the opposite end of the lever bears against a pin 38 on a reciprocable actuating bar 39 mounted as at 40 on panel 29, action of spring 37 as aforesaid causing the bar 39 to be moved into a normal position as shown in Fig. 2.

In order to move the wiper 32 of the permutating or grouping switch, there is provided a bell crank 41 pivoted as at 42 and having one leg 43 bearing against an offset 44 on the operating bar, the opposite leg of the bell crank being provided with an offset 45 which is engaged by a pin 46 on the operating slide 27. Thus, when the master control or slide 26 is pushed inwardly against the offset end portion 27a of the operating slide, bell crank 41 is rocked to retract the bar 39 and lever 36, so that pawl 35 will drop into succeeding teeth on ratchet 34 to rotate the latter under the restoring action of spring 37 when slide 26 is retracted to free the intervening mechanisms for return to normal position.

In the arrangement of Fig. 2, the operating slide 27 is latched in its inward or set position by operation of a latch bar 47 pivoted as at 48 and having a notched end portion 49 disposed to drop behind a pin 50 on slide 27 when the latter is pushed inwardly. Thus, the operating slide 27 is latched in its set position and all of the associated mechanism is prevented from operating until the latch is released.

Release of the latch 47 is effected by the patron in grasping and pivoting a main operating lever 51 (Fig. 1) which lever is provided with a pin 52 rocked against latch 47 to raise the latter and withdraw the notched end portion thereof from engagement with pin 50 so that slide 27 may return to normal position.

Associated with the operating slide 27 is a series switch for flashing the lamps in the thermometer stem successively at the beginning of each operation of the device, this series connecting switch including a wiper arm 54 pivoted as at 55 on panel 25 and having a series of contact pins 56 on its opposite end portions engageable with radially grouped contacts 57 disposed in a fan or segment-shaped arrangement on panel 25.

When the operating slide 27 is moved inwardly, a pin 58 thereon bears against the wiper 54 and moves the same from a normal position, in which it is maintained by a spring 59, into an advanced position in which it is held so long as the slide 27 is latched. The return movement of the wiper 54 by spring 59, when the operating slide is unlatched, is restrained by a dashpot 60, the operating arm of which is connected as at 60' to the wiper arm.

Also mounted on the control unit are supervisory switches A and B, the former of which includes a pair of contacts 61 and 62 which are biased to open circuit condition but are normally held in closed circuit condition by engagement therewith of a projection 63 on the stem of dashpot 60 under urgence of spring 59. Switch A also includes a contact 64 which is closed with contact 61 when the dashpot 60 is set.

Supervisory switch B includes a pair of contacts 65 and 66 biased to closed circuit condition and normally held open by action of a projection 67 on the stem of the second dashpot 68 retracted by a spring 69 so as to cause the projection 67 to bear against the contact 65 and move the same away from its companion contact.

The circuit connections with the control unit are illustrated in Fig. 3 and are best understood by reference to the operation of the control mechanism of Fig. 2. When the patron or operator approaches the machine, he pushes the master slide 26 inwardly, latching the operating slide 27 in its set or inward position until freed by actuation of the lever 51. When the operating slide 27 moves inwardly, contacts 61 and 64 on supervisory switch A are closed, connecting power from battery via conductor 70 to the wiper 54 of the series connecting or flashing switch, and at the same time contacts 65 and 66 of supervisory switch B are closed, connecting battery via conductor 71 to the two bulb lamps 15a which are now illuminated and, incidentally, also connecting battery via conductors 71 and 72 to one side of the series lamps 15 and the legend lamps 20, these latter lamps, however, not being illuminated until after the operation of the series or flashing switch means 54—57.

Thus, the bulb portion 13 of the simulated thermometer stem is illuminated, and meanwhile the pawl means 35—36 for the grouping or permutating switch has been advanced with respect to the ratchet 34 and the restorative movement of the operating slide 27, under the joint action of springs 37 and 59, begins as soon as slide 27 is unlatched when the patron operates lever 51. However, this restorative movement is relatively slow because of the control of dashpot 60, and as the contacts 56 sweep over the groups of contacts 57 (switch A still remaining closed), power is connected from the battery via conductor 70 and the wiper arm 54 successively to the contacts 57 which are severally connected by conductors 73 to the individual lamps 15, to illuminate the latter one by one, beginning from the lowest position 15c adjacent lamps 15a, and ending with the topmost lamp 15b as the movable contact arm 54 of the series or flashing switch moves back toward normal position.

During, and for an appreciable time after, the return of the contact arm 54 of the flashing switch, supervisory switch B is held closed by action of the dashpot 68, which is set for slower operation than dashpot 60, to retard the engagement of pin 67 with contact spring 65 until after the lapse of a period of one or two minutes after the arrival of contact arm 54 at its normal position, at which time switch B will again open, thus breaking the power connection to conductors 71 and 72 and extinguishing all lamps until the machine is again operated.

Up to this time, the legend lamps 20 have not been illuminated, the reason for this being that supervisory switch A has been held with its contact 61 out of engagement with contact 62. But when the topmost lamp 15b of the series in the stem has been illuminated in correspondence with the arrival of the contact wiper 54 back to its normal position, contact 61 will be moved by the projection 63 on the dashpot stem to engage contact 62 and connect battery via conductor 74 to the wiper 32 of the grouping or permutating switch, and during the foregoing operation of the series or flashing switch the pawl means 35—36 was being restored by spring 37 to advance the ratchet 34 and hence move the wiping contact arm 32 to a new position, and in consequence of this, contact arm 32 will stop upon one or another of the groups of contacts 31 and connect battery via conductors 75 to a certain group of lamps 15, which group may include only the lower lamp 15c above the bulb, or all of the lamps 15b to 15c, or any number of lamps less than all, beginning with 15c and extending in contiguity upwardly toward the topmost lamp. In addition to the illumination of the lamps in groups as aforesaid to represent the column of mercury in the stem, one group of legend lamps 20 opposite the topmost lamp of the group thus illuminated will likewise be energized through the action of the switch 30 by power received through connection 75 as illustrated particularly by conductor 75a or 75b, it being apparent that the energizing connection for each group of legend lamps 20 terminates in one of the banks of contacts 31 on the permutating switch along with the contacts for the corresponding series lamps 15.

In the arrangement of Fig. 2, it will be observed that the ratchet 34 will always be advanced the same number of steps upon each operation of the machine, so that the change in the grouping of the series or thermometer lamps is of a constant or fixed nature. In order to vary the grouping connections effected by switch 30 and thus effect a true permutation, it is contemplated that the ratchet 34 and associated contact arm 32 of the grouping switch may be caused to spin by provision of the arrangement of Fig. 4, wherein the ratchet 34 is moved by a pawl and lever means 35—36 as in the arrangement of Fig. 2, but lever 36 is locked in set position during the return movement of the bar 39, such locking being effected by a member 80 rockably mounted as at 81 and having an upper offset cam portion 82 which is transiently engaged by the lower end of the lever 36 when the latter is advanced to set position, the member 80 being urged by spring means 83 to snap back and block return of lever 36 during the return movement of the bar 39. Slightly before bar 39 approaches its normal position, a projection 84 thereon transiently engages the lower cammed offset portion 85 of member 80 and rocks the latter to move the offset 82 out of the way of lever 36, so that the latter may be snapped quickly by its spring 37 back to normal position, thus spinning ratchet 34.

Summary of operation

Slide 26 is pushed inwardly, causing slide 27 to be advanced and latched by member 47. This movement of slide 27 rocks the flashing switch arm 54 to advanced position, setting dashpots 60 and 68 and operating the supervisory switches A and B. Advance of the slide 27 also retracts the pawl means 35—36—39 for the grouping or permutating switch.

By rocking lever 51, latch 47 is withdrawn and the operating slide 27 may begin its return movement cooperably with the bar 39 and the contact arm 54 of the flashing switch. The contacts 56 on arm 54 in sweeping over the contacts 57 cause the lamps 15c to 15b to be successively illuminated to represent the mounting of the column of mercury in the stem of the thermometer. Meanwhile, the bulb portion 13 of this stem has been illuminated by lamps 15a under control of the supervisory switch A and particularly contacts 61—64 thereof which are permitted to remain closed until dashpot 60 returns to normal.

The supervisory switch B remains closed under control of dashpot 68 during and after the return movement of contact arm 54.

By the time the contact arm 54 of the flashing switch returns to normal position, the pawl means 35—36 will have been actuated either in accordance with the fixed advancing operation of Fig. 2 or the spinning operation afforded by the mechanism of Fig. 4, to move the wiping contact arm 32 of the grouping or permutating switch to a new position for the purpose of connecting one or more of the lamps 15c to 15b in an energizing circuit to represent the column of mercury standing at different heights to said stem. The foregoing group connection of the series lamps, as well as the illumination of an appropriate legend lamp or lamps 20, is under the control of the supervisory switch A and is effected when the latter returns to normal to close contacts 61 and 62 when wiping contact 54 of the flashing switch returns to normal.

After the lapse of a short interval of one or two minutes, during which time the patron may conveniently view the thermometer and the reading finally designated thereby, dashpot 68 will permit pin 67 to open supervisory switch B and extinguish all of the lamps and otherwise restore the apparatus to a condition preparatory to the next operation.

The various advantages and objects of the invention may be accomplished by modifications of the particular embodiment specifically described herein, and it is intended that the appended claims shall include all equivalent arrangements fairly coming within their call.

Having thus described my invention, what I claim as new and desire to protect by Letters Patent is:

1. A device of the class described comprising, in combination, lamps arranged in a series for illumination to simulate the rising of a thermometer column, means under the control of an operator for connecting said lamps successively in an energizing circuit to illuminate the same serially for the purpose aforesaid, means coacting with said first-mentioned means for automatically illuminating certain of said lamps as a group following each serial illumination thereof to give an indication of the height to which said simulated column has risen upon each operation of the device by the operator as aforesaid, and means coacting with said first and second-mentioned means for automatically changing the grouping of said lamps for illumination by said second-mentioned means each time the device is operated as aforesaid.

2. In an amusement apparatus, in combination, a series of lamps, an operating control, means actuated by said control for illuminating a lamp at one end of said series, means actuated by said control for successively illuminating the remaining lamps of said series, means actuated by said control for illuminating certain of said remaining lamps in groups following successive illumination thereof as aforesaid, means actuated by said control for changing the number of lamps to be illuminated by said group illuminating means each time said control is operated.

3. An amusement apparatus comprising, in combination, a series of lamps adapted to be illuminated to represent a thermometer column, an operating control, means actuated by said control for illuminating a lamp at one end of said series to denote the bulb portion of said thermometer column, means actuated by said control for successively illuminating the remaining lamps of the series to simulate the rising of said column from said bulb portion, means actuated by said control for illuminating certain of said remaining lamps, beginning at said bulb portion, in different groups each time the device is operated to indicate a different height to which said column has risen from the bulb portion following successive illumination of the lamps as aforesaid, and means for automatically changing the number of lamps included in said group each time said control is operated, whereby to procure different simulated readings of the thermometer each time the device is operated.

4. The combination of claim 3 further characterized by the addition thereto of legend lamps arranged opposite certain positions of said column and connected to be energized through said group changing means so that a legend lamp will be illuminated opposite the last lamp in each group following serial illumination as aforesaid.

5. An amusement apparatus comprising, in combination, a series of lamps arranged for illumination to represent the positions of a mercury column in a thermometer, a lamp positioned at one end of said series to designate in similitude the bulb portion of said column, an operating control and switch means actuated thereby for illuminating the lamp designating the bulb portion as aforesaid and illuminating in succession the remaining lamps of the series to simulate the rising of the mercury column and thereafter illuminating a different number of said lamps after the one designating the bulb portion each time said control is actuated to designate the mercury column at rest.

6. The combination of claim 5 further characterized by the inclusion of legend lamps positioned opposite the series lamps and means coacting with said switch means for connecting that one of said legend lamps which is opposite the topmost illuminated lamp of said column remote from said bulb portion when the column is at rest as aforesaid.

7. An amusement device comprising, in combination, a plurality of lamps and means for successively illuminating the same to simulate the movement of a thermometer element in measuring a rising temperature, means operable to illuminate one or more of said lamps as a group to designate in similitude said thermometer element in a condition of rest following the successive illumination of said lamps, and means cooperable with said last-mentioned means for changing the number of lamps illuminated as a group in the manner aforesaid following each successive illumination of the series of lamps.

8. The combination of claim 7 further characterized by the provision of means providing a thermometer scale with respect to which said thermometer element is portrayed in motion and at rest by illumination of the lamps as aforesaid.

9. A simulated amusement thermometer comprising, in combination, means providing a thermometer scale, a plurality of lamps situated with respect to said scale for successive illumination to simulate the movement of a thermometer element with respect to the scale, means for successively energizing said lamps for the purpose aforesaid, lamp means situated at one end of said scale to designate a starting position from which said thermometer element moves in similitude, means for illuminating one or more of said lamps after said starting position to represent said thermometer element in a condition of rest following successive illumination of the lamps, and means cooperable with said last-mentioned means to change the number of lamps illuminated to represent said element at rest after each successive illumination of the lamps representing the element in motion, whereby to represent different temperature readings.

10. An amusement apparatus comprising, in combination, a translucent panel having delineated thereon a thermometer scale with a bulb portion at one end, an electric lamp arranged to illuminate said bulb portion, and a series of lamps positioned along said scale and illuminable in succession to simulate the rising of a thermometer column with respect to said scale from said bulb portion, indicia means positioned at certain points along said scale each substantially opposite one of said series of lamps, lamps arranged to illuminate individual indicia means, and switching mechanism connected with said lamps for operation to illuminate the bulb-designating lamp and thereafter to successively effect illumination of the lamps of said series and thereafter to illuminate one or more of said series of lamps as a group beginning at said bulb portion to represent the thermometer column in a condition of rest, and to illuminate one of said indicia lamps opposite the top of said column, and switch means actuated cooperably with said first-mentioned switching mechanism for changing the number of lamps illuminated as a group following each successive illumination of the same in the manner aforesaid.

11. In a device of the class described, in combination, means portraying a thermometer scale, a series of lamps arranged along said scale for illumination to represent the movement of a thermometer column with respect to the scale, switch mechanism for successively illuminating said lamps for the purpose aforesaid and thereafter operating to connect a certain number of lamps for illumination as a group to designate said column in a condition of rest, together with switch means for changing the number of said lamps connected to represent the column at rest as aforesaid, after each successive illumination of the lamps to represent the column in motion.

12. In a device of the class described, in combination, means portraying a thermometer scale, a series of lamps arranged along said scale for illumination to represent the movement of a thermometer column with respect to the scale, switch mechanism for successively illuminating said lamps for the purpose aforesaid and thereafter operating to connect a certain number of lamps for illumination as a group to designate said column in a condition of rest, together with switch means for changing the number of said lamps connected to represent the column at rest as aforesaid after each successive illumination of the lamps to represent the column in motion, and a plurality of indicating lamps positioned along said scale, and switch means connected for operation to illuminate one of said indicating lamps which is positioned approximately opposite the lamp which indicates the top of said column when the latter is portrayed at rest as aforesaid.

13. An amusement device including means portraying a thermometer having a stem and a bulb portion with indicia means arranged along said stem, electric lamps positioned to illuminate said bulb portion, said stem and said indicia means, and mechanism including an operating control, means actuated by said control for maintaining the bulb-illuminating lamps in energized condition, a flashing switch actuated by said control for flashing the lamps along said stem to simulate the movement of a thermometer element with respect thereto, a grouping switch actuated by said control for connecting one or more of the lamps illuminating the stem above said bulb portion to represent the thermometer element in a condition of rest and further operable to change the number of lamps illuminated to portray the element at rest as aforesaid each time said control is actuated, said grouping switch being arranged further to connect that one of the indicia lamps which is opposite the endmost lamp representing the element at rest following each flashing of the stem lamps.

JOHN F. MEYER.